United States Patent
Busse et al.

(10) Patent No.: US 12,272,493 B2
(45) Date of Patent: Apr. 8, 2025

(54) METHOD FOR PRODUCING A SPIRAL-SHAPED BODY WITH A COMPRESSED SPIRAL

(71) Applicant: Fraunhofer-Gesellschaft zur Förderung der Angewandten Forschung E.V., Munich (DE)

(72) Inventors: Matthias Busse, Bremen (DE); Franz-Josef Wöstmann, Bremen (DE)

(73) Assignee: Fraunhofer-Gesellschaft zur Förderung der Angewandten Forschung E.V., Munich (DE)

( * ) Notice: Subject to any disclaimer, the term of this patent is extended or adjusted under 35 U.S.C. 154(b) by 811 days.

(21) Appl. No.: 17/310,497

(22) PCT Filed: Feb. 14, 2020

(86) PCT No.: PCT/EP2020/053953
§ 371 (c)(1),
(2) Date: Aug. 6, 2021

(87) PCT Pub. No.: WO2020/165435
PCT Pub. Date: Aug. 20, 2020

(65) Prior Publication Data
US 2022/0013286 A1 Jan. 13, 2022

(30) Foreign Application Priority Data
Feb. 15, 2019 (DE) .................... 10 2019 202 049.6

(51) Int. Cl.
*H01F 41/071* (2016.01)
*H01F 27/32* (2006.01)
(Continued)

(52) U.S. Cl.
CPC ......... *H01F 41/071* (2016.01); *H01F 27/323* (2013.01); *H01F 41/098* (2016.01); *H02K 15/0431* (2025.01); *H01F 41/122* (2013.01)

(58) Field of Classification Search
CPC .... H01F 41/098; H01F 41/071; H01F 41/122; H01F 41/0253; H01F 27/323
See application file for complete search history.

(56) References Cited

U.S. PATENT DOCUMENTS 4,268,810 A * 5/1981 Iwasa .................... H01F 41/122
427/116
5,563,463 A * 10/1996 Stark .................... H01F 41/0253
310/156.28

FOREIGN PATENT DOCUMENTS

CN 108022794 A 5/2018
DE 102014000636 A1 7/2015
(Continued)

OTHER PUBLICATIONS

Evans et al, "Vacuum Pressure Impregnation Process in Superconducting Coils: Best Practice," in IEEE Transactions on Applied Superconductivity, vol. 22, No. 3, pp. 4202805-4202805, Jun. 2012. (Year: 2012).*

(Continued)

*Primary Examiner* — A. Dexter Tugbang
(74) *Attorney, Agent, or Firm* — Marshall & Melhorn,LLC

(57) ABSTRACT

A method for producing a spiral-shaped body, in particular an electric coil, made of an electrically conductive material. First, the material is wound about a mandrel in a casting mold in order to form a coil with a plurality of windings, and pressure is then exerted onto the coil in the axial direction of the coil. The pressure leads to a deformation and compression of the cross-section of the individual windings in the axial direction of the coil. By compressing the coil, an (Continued)

optimal use of space is achieved with an electric coil, for example for an electric machine.

17 Claims, 6 Drawing Sheets

(51) Int. Cl.
*H01F 41/098* (2016.01)
*H02K 15/043* (2025.01)
*H01F 41/12* (2006.01)

(56) References Cited

FOREIGN PATENT DOCUMENTS

| EP | 1530225 | A2 | | 5/2005 |
|----|---------|----|----|--------|
| JP | S63135228 | A | | 6/1988 |
| JP | 2005310566 | A | | 11/2005 |
| JP | 2005319479 | A | | 11/2005 |
| JP | 2006157989 | A | | 6/2006 |
| JP | 2006158024 | A | | 6/2006 |
| JP | 2010258201 | A | | 11/2010 |
| JP | 2014183428 | A | | 9/2014 |
| JP | 2014225545 | A | * | 12/2014 |

OTHER PUBLICATIONS

Machine Translation of Japanese Patent Publication JP 2005-319479.*
European Patent Office, International Search Report and Written Opinion in Application No. PCT/EP2020/053953, dated Jul. 6, 2020, 15 pages, Rijswijk Netherlands.
China National Intellectual Property Administration, CN Office Action in Application No. 202080014558.9, dated Jun. 1, 2023, 13 pages.

* cited by examiner

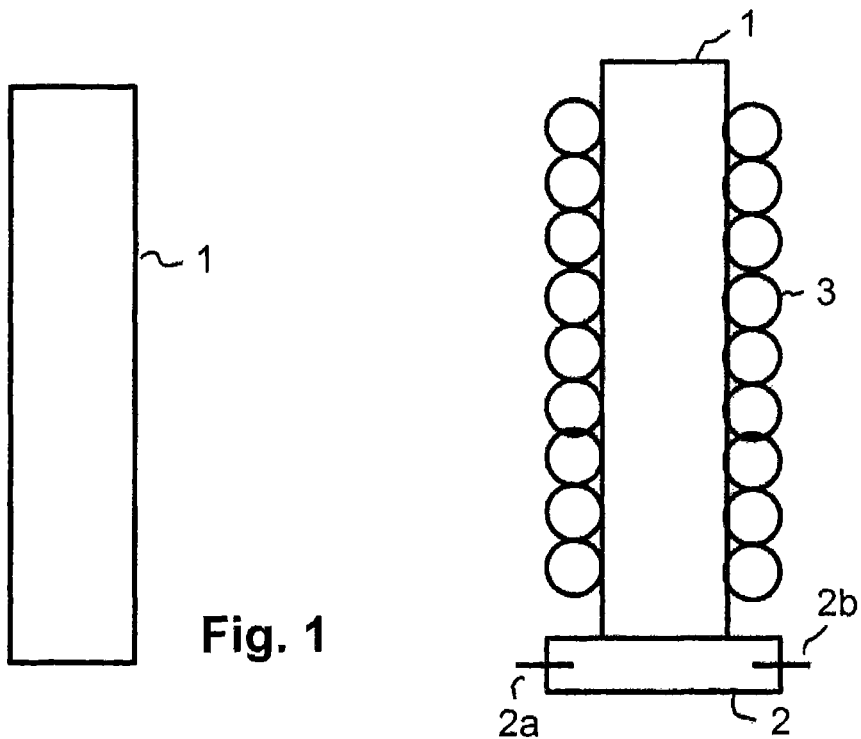
Fig. 1
Fig. 2
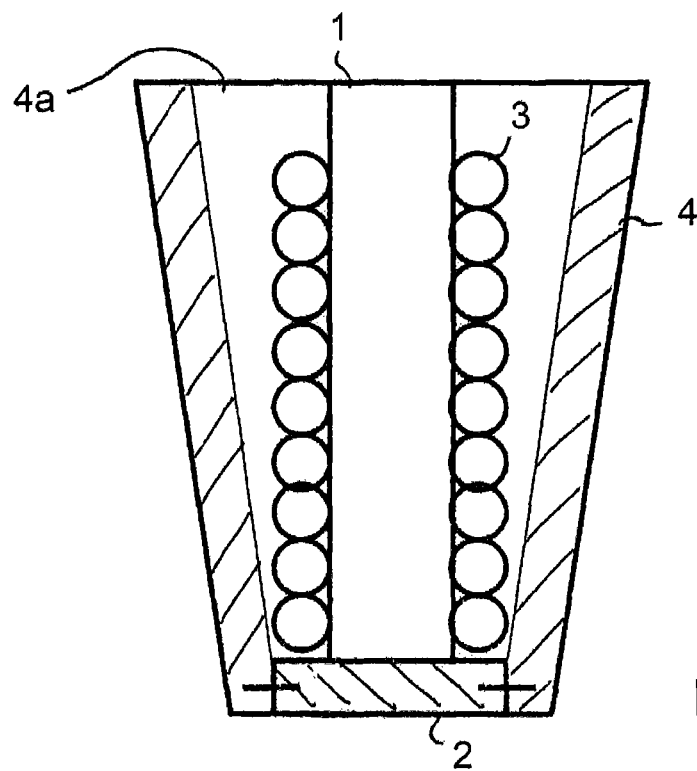
Fig. 3

METHOD FOR PRODUCING A SPIRAL-SHAPED BODY WITH A COMPRESSED SPIRAL

FIELD

The invention resides in the mechanical engineering field and can particularly advantageously be used in the area of foundry technology when producing helices by way of metal casting.

BACKGROUND

Helical metallic bodies can be used for many different purposes in electrical engineering and mechanics, for example as springs or electrical coils. So far, primarily wound coils are used in electrical machines, which are produced by winding strand-shaped metallic bodies, for example wires. This manufacturing technique often does not optimally fill the available installation space. In particular when such coils do not have a cylindrical shape, the production is often associated with additional manual effort during winding.

So as to increase the fill level and increase the power or torque density of electrical machines comprising such windings/coils, it has already been described to produce such helical bodies by way of a metal casting process. This enables great freedom in the configuration of the cross-sections and the outer shape of such a helix. In particular, for example, the cross-section of individual turns can also be freely configured. Through optimized space utilization and heat dissipation, it is possible to optimize both the electrical power and the efficiency with which heat is dissipated. The production of helices and electrical coils by way of casting, however, entails other disadvantages during manufacturing.

Against the background of the prior art, it is the object of the present invention to create a method for producing a helical body, in particular an electrical coil, which enables optimal space utilization by the resulting product, while minimizing the manufacturing complexity.

SUMMARY

The object is achieved according to the invention by the features of the claims 1. The dependent claims describe possible implementations of a method for producing a helical body. The invention additionally relates to a device having the features of the claims, and to possible embodiments of such a device.

The invention accordingly relates to a method for producing a helical body, in particular an electrical coil, from an electrically conductive material, in which first the material, in a strand shape, is wound around a mandrel to form a helix having a multitude of turns, then, prior to exerting pressure, the mandrel and the helix are placed into a die, and a base plate fixedly connected to the mandrel is connected to the die by way of a form-locked connection, in particular a bayonet catch, and then pressure is exerted on the helix in the axial direction thereof, which results in a deformation and a compression of the cross-sections of the individual turns in the axial direction of the helix.

In principle, initially a conventional method in the form of winding a helix may be used when shaping the electrical coil. Thereafter, the material of the helix is deformed by the exertion of axial pressure on the helix in such a way that the cross-sections of individual or all turns are deformed. In this way, tighter packing of the turns in the longitudinal direction of the helix is achieved, and the space requirement for the helix remains decreased, while keeping the number of turns the same. At the same time, the cross-sections of the individual turns are able to expand in the radial direction. An electrical coil formed of the helix thus becomes more efficient and space-saving. In addition, improved heat conduction between the turns of the helix can improve thermal conductivity overall, and thus the dissipation of lost heat.

In one embodiment of the method, it may be provided that axial pressure is consecutively exerted multiple times on the helix, in particular in the form of pulse-like strikes. With this, a compression can be carried out in a multi-stage deformation process so that, in many instances, sufficient deformation can be achieved without material cracks or possibly structural changes. A pulse-like increase in pressure, for example by way of strikes, has the advantage that high pressure forces can briefly and dynamically be generated, without having to provide a device that statically generates or withstands the corresponding forces.

Another embodiment can provide that the pressure on the helix is increased in multiple stages, wherein the pressure is temporarily lowered again, in particular in each case after an increase in pressure. Such a multi-stage pressure increase on the helix can also have an advantageous result within the meaning of limited structural changes due to the material of the helix being deformed in multiple stages.

For shaping the helix, it may be provided that the mandrel and the helix, prior to the pressure being exerted, are placed in a die which surrounds the helix and limits a radial expansion of the helix to the outside. A radial expansion of the helix during the exertion of axial pressure is limited by way of the die. As a result of the die, an outer target shape of the helix can be defined, which can be implemented by exerting sufficient axial pressure. In particular, the helix can be axially compressed on the mandrel, and between the mandrel and the die, by the exertion of pressure, until it fills the space between the mandrel and the die. For this purpose, the mandrel and the die are arranged coaxially with respect to one another, and in particular are connected to one another.

The die can include a cylindrical or frustum-shaped cavity so that the helix, after the compression, likewise has a cylindrical or frustum-shaped outer contour. Such a helix can, for example, be used as an electrical coil in a rotating electrical machine, in which the installation space available for individual windings likewise has a frustum shape.

Both the mandrel and the die can be made of a stable metal, in particular made of steel.

Winding the helix onto the mandrel advantageously takes place before the mandrel is introduced into the die, so that an advantageous design provides a separate mandrel and a die connectable thereto. The mandrel and the die can be connectable to one another in the radially narrowest region of the die.

Another embodiment of the method can provide that the pressure on the helix, or the intensity of the pressure pulses, is selected in such a way that, in the case of at least one turn of the winding, the height in the axial direction of the helix is reduced by at least 10%, and in particular at least 20%.

During the axial compression of the helix, individual turns can be compressed the most axially in the region in which the die is expanded the most radially. In this region, the ratio of the radial width of an individual turn to the height thereof in the longitudinal direction of the helix is the greatest, and is greater than in the radially narrower regions of the die. For example, the helix can be compressed in such a way that a ratio of the radial width to the height of 2:1, or in particular even 5:1, is achieved for the cross-section of the wound strand.

In another embodiment of the method, it may be provided that the strand-shaped material is provided with an electrically insulating and/or impregnating outer layer before or after the winding process. A layer that is also deformed during the deformation of the strand-shaped material can be provided as the insulating outer layer, so that the outer layer remains closed during the deformation. In particular easily deformable plastic materials are suitable for this purpose. An oxide layer may also be provided as the outer layer, for example, which newly forms after the deformation of the helix, upon contact with air at crack sites that arise, and electrically insulates the turns of the helix.

In one embodiment of the method, it may also be provided that the strand-shaped material is provided with an in particular electrically insulating and/or impregnating outer layer after the compression of the helix. This can be made possible, for example, by the helix being elastic, as a result of which, after compression and deformation of the turns, the helix itself elastically expands to a certain degree in the axial direction after the compression force has been lowered, so that the individual turns of the helix establish a distance with respect to one another, and are thus accessible for a coating. The coating can then be applied by immersing the helix or by spraying, for example. It is also possible to fill the intermediate space between the turns of the helix with an insulating material by casting in such a way that the individual turns of the helix are electrically insulated from one another. For this purpose, the insulating material can be selected so that capillary action causes or supports the liquid material being drawn into the intermediate spaces of the helix. The casting can be carried out in the form of vacuum casting. The connection between the base plate of the mandrel and the die can be designed to be vacuum-tight for this purpose. For the coating process, the helix can also be temporarily elastically expanded in the longitudinal direction while applying a force.

Another advantageous embodiment of the invention can accordingly provide that the helix is sealed with a filler material by casting after compression, which completely fills the intermediate spaces between the turns of the helix.

In addition to a method of the type described above, the invention also relates to a device for carrying out the method, which comprises a die, a connecting device for connecting the die to a mandrel for winding the helix, and a pressure device comprising a ram, which in particular includes a recess for accommodating the mandrel.

In addition, it may be provided that the die includes a conical cavity for accommodating the compressed helix.

DESCRIPTION OF THE FIGURES

The invention will be shown and described hereafter based on figures of a drawing. In the drawings:

FIG. 1 shows a mandrel around which a coil can be wound;

FIG. 2 shows a mandrel including a coil wound thereon;

FIG. 3 shows a mandrel including a coil wound thereon in a die;

DETAILED DESCRIPTION

Figure 4:
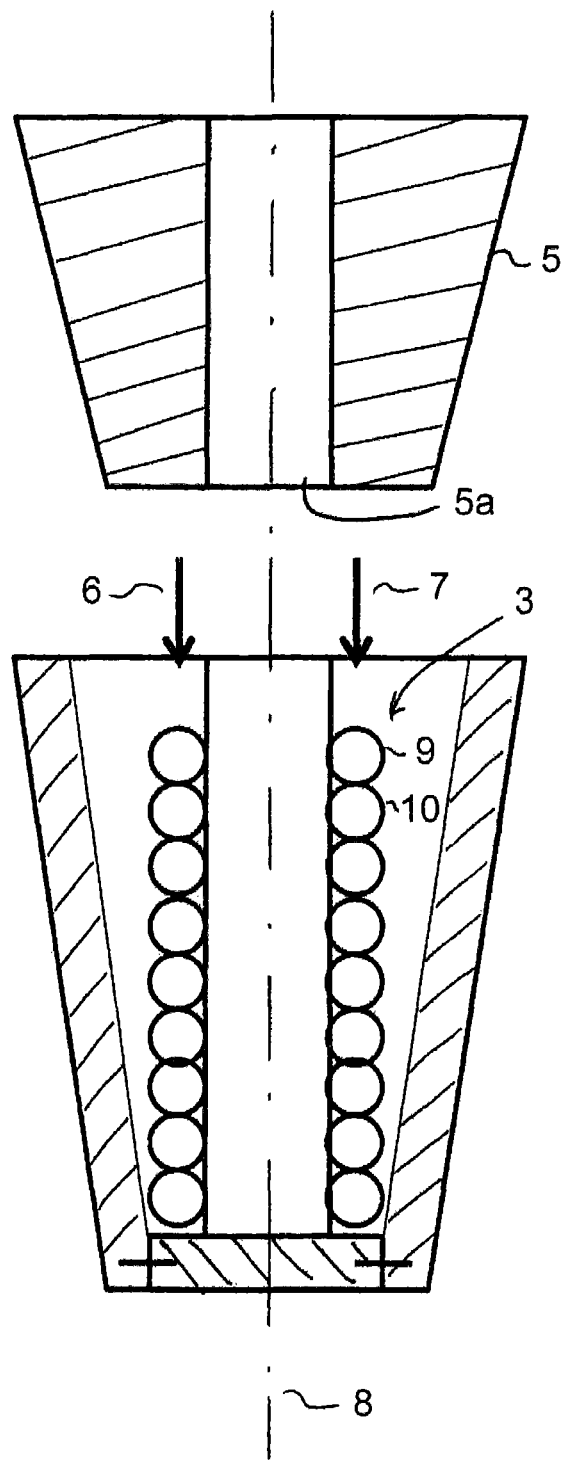
FIG. 4 shows a mandrel with a die and a pressure tool.

FIG. 1 shows a mandrel 1, which can have a cylindrical design, for example, that is, has a circular cross-section. However, the mandrel 1 can also have an elliptical or polygonal cross-section or a differently shaped cross-section.

FIG. 2 shows a mandrel 1 that is connected to a connecting device 2 in the form of a base plate. A helix 3 of a strand-shaped material is wound onto the mandrel 1. The strand-shaped material can, for example, be a metal wire having a round cross-section. The metal can be aluminum, an aluminum alloy, copper or a copper alloy, for example. The metal wire can also have an elliptical or differently shaped cross-section. The base plate 2, serving as the connecting element, comprises elements 2a, 2b protruding therefrom, which cooperate with a bayonet catch of a die 4.

FIG. 3 shows a mandrel 1 including a wound helix 3 on a base plate 2, wherein a conical die 4 is connected by way of a bayonet catch to the base plate 2, and thus also the mandrel 1. The conical die 4 concentrically surrounds the mandrel 1. The helix 3, in the form of a single-layer winding, is located in the conical cavity between the die 4 and the cylindrical mandrel 1.

FIG. 4 shows a ram 5 of a pressure device above the die 4, the drive mechanism of which is not shown in detail. The drive mechanism can be hydraulic, for example. The arrows 6, 7 indicate the direction in which the ram 5 is introduced into the die 4. The ram 5 presses on the helix 3 in the longitudinal direction of the arrangement, which is denoted by the axis 8. The pressure by the ram 5 is increased to such an extent that the individual turns 9, 10 of the helix 3 are compressed so that the cross-sections of individual turns are deformed.

Figures 5, 6:
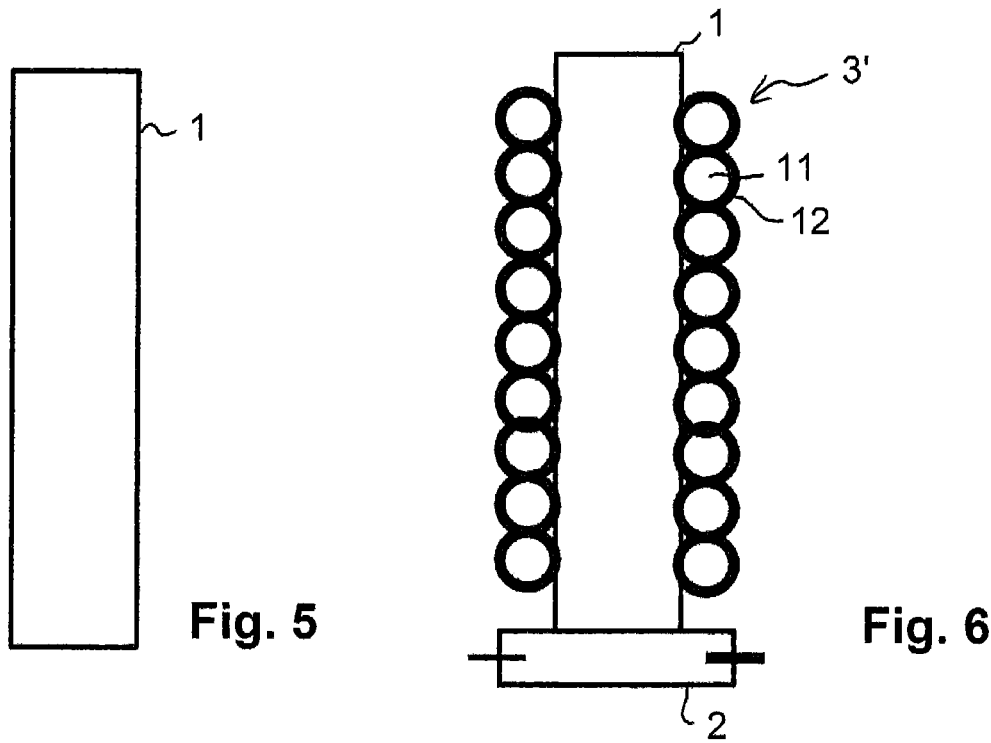
FIG. 5 shows another mandrel for winding a coil.
FIG. 6 shows a coil made of a strand-shaped material, including an insulating layer, wound onto the mandrel.

FIGS. 5 and 6 show a configuration including a mandrel 1 and a base plate 2, wherein a strand-shaped metal body 3' is wound in the form of a helix onto the mandrel 1, and wherein the strand-shaped metal body is composed of a wire 11 including a cover layer 12. The cover layer is usually electrically insulating and can, for example, be designed as an oxide layer or also as a polymer layer or, generally speaking, as a plastic layer.

Figure 7:
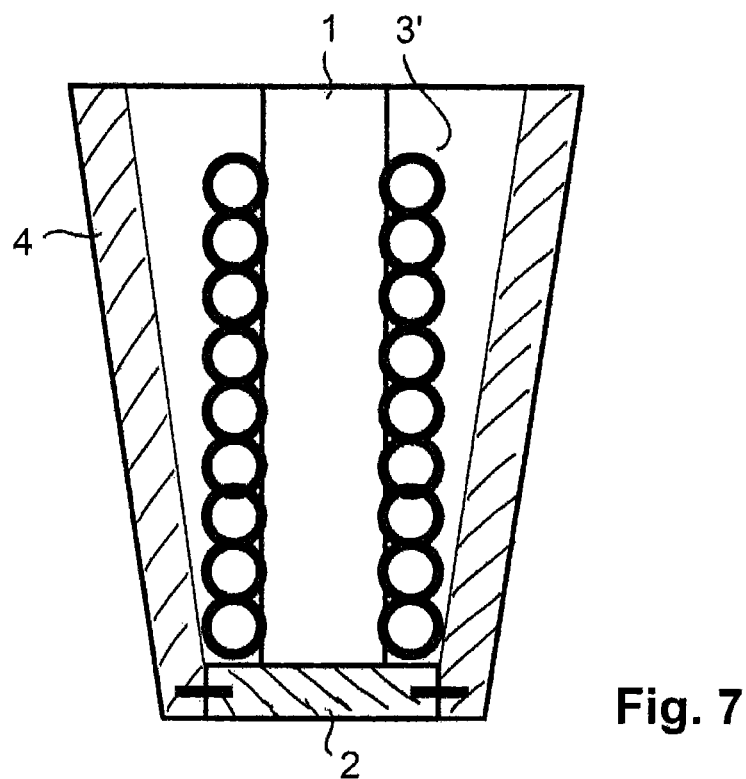
FIG. 7 shows a wound coil including insulation on a mandrel in a die.

FIG. 7, in a manner comparable to FIG. 3, shows a helix 3' made of an insulated wire in a die 4.

Figure 8:
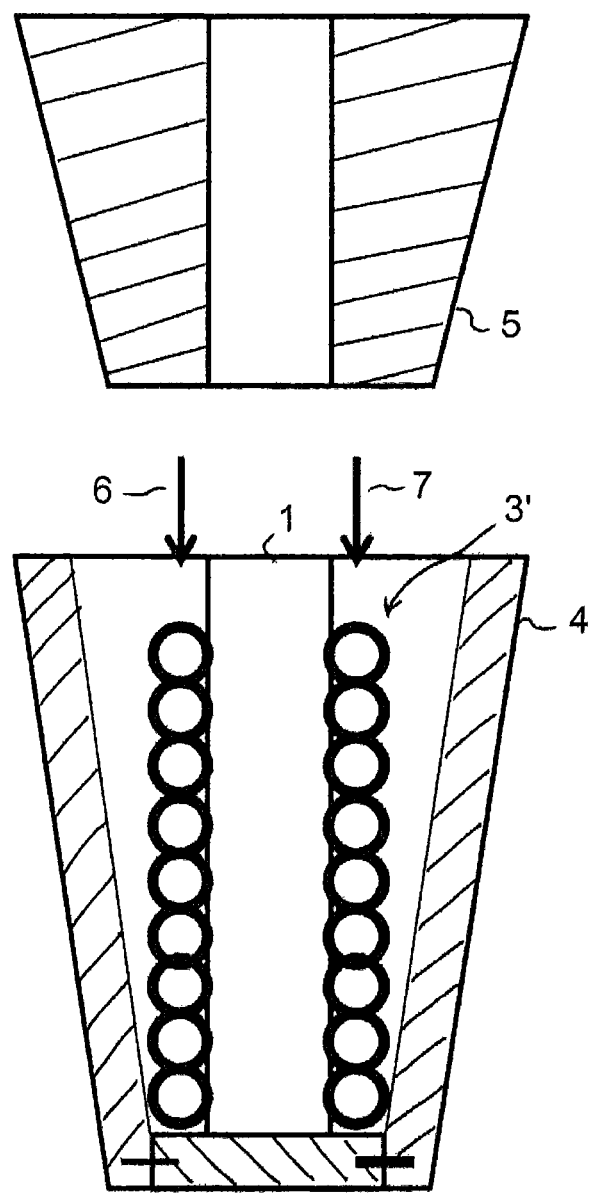
FIG. 8 shows a die with a mandrel, a coil and a pressure tool.

FIG. 8, in a manner comparable to FIG. 4, shows a configuration including a die 4, a mandrel 1 onto which a helix 3' is wound, and a ram 5 for the axial compression of the helix 3' in the direction of the arrows 6, 7. The helix is composed of a strand-shaped metallic body, which is provided with a cover layer.

Figure 9:
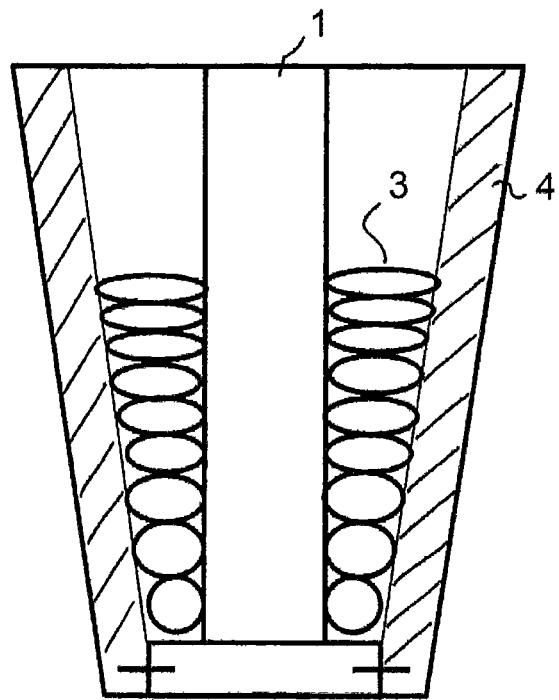
FIG. 9 shows a coil without insulating layer in a die after a compression.

FIG. 9 shows the helix 3 in the die 4 after a first compression process. It is apparent that several or also all of the turns of the strand-shaped metallic body/wire are deformed in terms of the shape of the cross-section. As a result of the axial compression, the individual turns have been flattened in the longitudinal direction of the arrangement. Since, due to the conical shape of the cavity, more or less space is available in the radial direction in the die 4 for the individual turns, depending on the position along the longitudinal axis, the individual turns can be more or less flattened. It is apparent that the turns of the helix located the furthest toward the bottom in FIG. 9 are flattened the least, while the uppermost turns have the flattest shape since these are able to expand the most in the radial direction of the arrangement.

Figure 10:
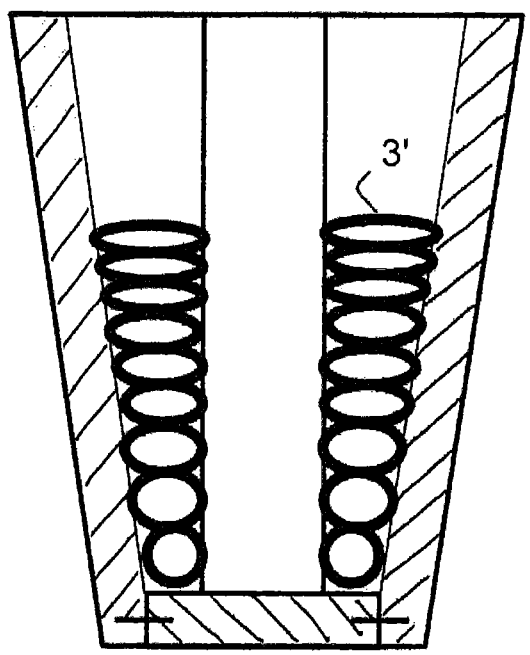
FIG. 10 shows a coil with an insulating layer in a die after a compression.

FIG. 10 shows a situation similar to that of FIG. 9, however based on a wire, which includes a cover layer and has been compressed therewith.

The helix 3, 3' can be compressed even further, either by increasing the compression force acting by a ram 5, or by repeated strike-like compression. In this way, the intermediate spaces between the individual turns of the helix 3, 3' can be further reduced, whereby the space filling by the helix is improved. Depending on the ductility of the material of which the strand-shaped body which forms the helix is made, the intermediate spaces can essentially be reduced to zero.

Figure 11:
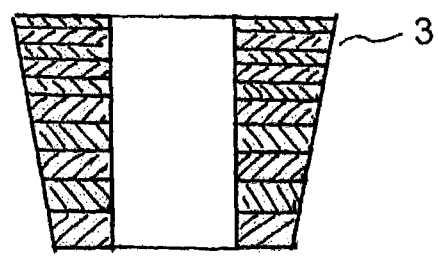
FIG. 11 shows a coil without insulating layer, compressed in a die.
Figure 12:
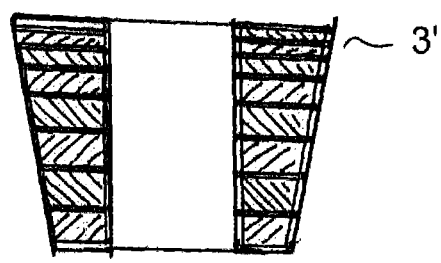
FIG. 12 shows a coil with an insulating layer, compressed in a die.

FIGS. 11 and 12 each show a helix, wherein FIG. 11 shows the helix made of a strand-shaped body without cover layer, while FIG. 12 shows a helix made of a strand-shaped body with a cover layer. In both instances, the helix has been compressed so as to completely fill the intermediate spaces between the individual turns. The radially outer contour of the helix now corresponds to the inner contour of the die 4, while the inner cylindrical contour of the helix corresponds to the outer surface of the mandrel 1. In this form, the helix can now be installed into an electrical machine, for example. It may be useful or necessary, prior to installation, to apply a first or an additional cover layer to the surface of the individual turns of the helix, or to anneal a cover layer that was damaged during the course of the compression of the helix, for example by way of a heat treatment.

In the case of the helix shown in FIG. 11, an intermediate space between the individual turns of the helix can arise, after the ram has been removed, due to resiliency, which can be filled with a cover layer material. By immersing the helix into an insulating material, for example a resin, the individual turns can then be insulated with respect to one another. If the intermediate spaces between the individual turns of the helix are not sufficient, the helix can also be elastically expanded during the application of a cover layer until the cover layer has solidified by drying and/or curing/polymerization.

A helix having the shape shown in FIGS. 11 and 12 can, for example, be placed onto a tooth of a lamination stack in an electrical machine. If such teeth are distributed in a star-shaped manner at the circumference in the electrical machine, the intermediate spaces between the teeth likewise have the conical shape, which is filled optimally by a conical helix in the illustrated shape.

What is claimed is:

1. A method for producing a helical body including an electrical coil from an electrically conductive material, comprising:

first winding the electrically conductive material, in a strand shape, around a mandrel to form a helix having a multitude of turns, next, prior to exerting a pressure, the mandrel and the helix are placed into a die, and a base plate fixedly connected to the mandrel is connected to the die by way of a form-locked connection, then the pressure is exerted on the helix in an axial direction of the helix, which results in a deformation and a compression of cross-sections of the multitude of turns in the axial direction of the helix, wherein an axial pressure is consecutively exerted multiple times on the helix in a form of pressure pulse strikes.

2. The method according to claim 1, wherein the mandrel and the helix, prior to the pressure being exerted, are placed in the die which surrounds the helix and limits a radial expansion of the helix to the outside.

3. A method according to claim 1, wherein the strand shape of the electrically conductive material is provided with an electrically insulating and/or impregnating outer layer before or after the winding of the electrically conductive material.

4. A method according to claim 1, wherein the strand shape of the electrically conductive material is provided with an electrically insulating and/or impregnating outer layer after the compression of the helix.

5. The method according to claim 1, wherein the helix is sealed with an electrically insulating filler material by casting after the compression, which completely fills intermediate spaces between the multitude of turns of the helix and electrically insulates the multitude of turns of the helix from one another.

6. A device for carrying out the method according to claim 1, wherein the die includes a connecting device for connecting the die to the mandrel for winding the helix, and a pressure device comprising a ram, which comprises a recess for accommodating the mandrel.

7. The device according to claim 6, wherein the die includes a conical cavity for accommodating the compression of the helix.

8. A method for producing a helical body including an electrical coil from an electrically conductive material, comprising:

first winding the electrically conductive material, in a strand shape, around a mandrel to form a helix having a multitude of turns, next, prior to exerting a pressure, the mandrel and the helix are placed into a die, and a base plate fixedly connected to the mandrel is connected to the die by way of a form-locked connection, then the pressure is exerted on the helix in an axial direction of the helix, which results in a deformation and a compression of cross-sections of the multitude of turns in the axial direction of the helix, wherein the pressure on the helix is increased in multiple stages, in which the pressure is temporarily lowered again in each case after an increase in the pressure.

9. A method according to claim 8, wherein the strand shape of the electrically conductive material is provided with an electrically insulating and/or impregnating outer layer before or after the winding of the electrically conductive material.

10. A method according to claim 8, wherein the strand shape of the electrically conductive material is provided with an electrically insulating and/or impregnating outer layer after the compression of the helix.

11. The method according to claim 8, wherein the helix is sealed with an electrically insulating filler material by casting after the compression, which completely fills intermediate spaces between the multitude of turns of the helix and electrically insulates the multitude of turns of the helix from one another.

12. The method according to claim 8, wherein the mandrel and the helix, prior to the pressure being exerted, are placed in the die which surrounds the helix and limits a radial expansion of the helix.

13. A method for producing a helical body including an electrical coil from an electrically conductive material, comprising:
- first winding the electrically conductive material, in a strand shape, around a mandrel to form a helix having a multitude of turns,
- next, prior to exerting a pressure, the mandrel and the helix are placed into a die, and a base plate fixedly connected to the mandrel is connected to the die by way of a form-locked connection,
- then the pressure is exerted on the helix in an axial direction of the helix, which results in a deformation and a compression of cross-sections of the multitudes of turns in the axial direction of the helix,
- wherein the pressure on the helix, or an intensity of pressure pulses, is selected in such a way that, in a case of at least one turn of the winding, a height in the axial direction of the helix is reduced by at least 10%.

14. A method according to claim 13, wherein the strand shape of the electrically conductive material is provided with an electrically insulating and/or impregnating outer layer before or after the winding of the electrically conductive material.

15. A method according to claim 13, wherein the strand shape of the electrically conductive material is provided with an electrically insulating and/or impregnating outer layer after the compression of the helix.

16. The method according to claim 13, wherein the helix is sealed with an electrically insulating filler material by casting after the compression, which completely fills intermediate spaces between the multitudes of turns of the helix and electrically insulates the multitude of turns of the helix from one another.

17. The method according to claim 13, wherein the mandrel and the helix, prior to the pressure being exerted, are placed in the die which surrounds the helix and limits a radial expansion of the helix.

* * * * *